Patented Feb. 28, 1933

1,899,230

UNITED STATES PATENT OFFICE

CLARENCE W. CROWELL, OF BEVERLY HILLS, CALIFORNIA

GLASS MIX FOR OPAQUE CONTAINERS AND METHOD OF MAKING THE SAME

No Drawing.   Application filed October 3, 1930.   Serial No. 486,294.

This invention relates to a glass mix or batch for use in making opaque containers.

Black glass has been made heretofore and opaque glass has also been produced, but a satisfactory glass mix capable of producing glass containers completely impervious to light rays has not been invented or used heretofore. The black glass made heretofore contained very large quantities of opacifying ingredients and employed pigments or opacifiers of high cost. Opaque glass produced in accordance with known methods and formulas is, furthermore, very brittle and does not have the physical durability which permits the employment of such glass for the manufacture of relatively thin-walled containers such as bottles, jars, urns, etc. Furthermore, ordinary opaque glass is not elastic nor tough, and is not heat resisting and can not be used in the manufacture of containers by the blow, or press and blow machines now customarily used for the manufacture of bottles and the like.

An object of this invention is to provide and disclose a glass mix which produces an opaque glass of high physical durability.

Another object is to disclose and provide a glass mix or batch capable of being used in the manufacture of containers impervious to light rays.

An object of this invention is to disclose and provide a new and novel glass batch employing opacifying agents of low cost.

Another object is to disclose and provide a method of making opaque glass of such physical durability as to permit it to be used in the manufacture of containers.

Ordinary opaque glass may customarily contain fluorspar, bone ash, lepidolite and pyrolusite or manganese dioxide, but the glass is extremely brittle and of little strength. For example, the black glass or vitreolite used for purposes of ornamentation at the present time is representative of black glass as made heretofore, but such glass is not adapted for the manufacture of bottles or other containers because of its susceptibility to temperature changes and its brittleness. Glass containers, particularly when such containers are to be used for food products, must be strong to resist pressures and handling and must be heat resisting to withstand the rapid changes in temperature and high temperatures employed for sterilization of contents.

It is particularly advantageous to use black glass for food containers inasmuch as numerous food products are adversely affected by light rays. For example, fruit juices, such as pure orange juice, can not be stored in ordinary glass containers for an appreciable length of time, even though said orange juice is saturated with carbon dioxide under pressure, as an enzymatic action or other action takes place therein by action of light rays passing through the container. Containers made from perfectly opaque glass, however, can be used for such food products without causing such food products to spoil.

The most common method of obtaining a dark coloration in glass is to use manganese dioxide, but large quantities thereof are necessary and the glass is not absolutely opaque but has a purplish tint. Cobalt, copper and iron oxides have often been added so as to produce a black color. All of these opacifying agents are expensive and large quantities thereof are necessary in order to produce an opaque glass. Even though the glass is opaque, it is, as has been stated before, unsuitable for use in the manufacture of glass containers.

It has been discovered that a black opaque glass suitable for the manufacture of glass containers can be made by the hereinafter described process from any basic formula of the character generally classified as soda lime glass. For example, the basic formula of a soda lime glass which may be well used in carrying out this process may be:

| Per cent | |
|---|---|
| 74.5 | $SiO_2$ |
| 0.5 | $Al_2O_3$ |
| 17.5 | $NaO$ |
| 7.5 | $CaO$ |

It will be understood, of course, that this formula is only representative of the character of the basic glass from which the opaque glass may be made. Preferably, however, the lime content should not exceed about 8.5%.

The opacity of the glass is developed by adding carbon, metallic oxide capable of forming black sulphide, and sulphur to the glass batch in sufficient quantities to give an opaque glass. It will be found that in this manner a glass is obtained which is completely opaque, has a good gloss, is of high physical durability, is strong, elastic, tough and heat resisting.

The carbon to be used in the mix is preferably in finely divided form and may be graphite, coal, coke, or other similar product. Copper, silver, mercury, nickel, iron, lead and molybdenum produce black sulphides and therefore these metals or their oxides are preferably used. In view of its cost, silver is ordinarily not used. Instead of using a metallic oxide such, for example, as lead oxide, the metal itself in finely divided form may be used. The sulphur is preferably a technical grade of sulphur in the crystalline finely divided form. A sulphide or other salt containing sulphur may be used, but the cost of the finished glass is increased thereby.

The metallic oxides preferably used are cuprous oxide and lead monoxide or lead suboxide. The lower oxides of copper and lead are preferred to the higher oxides, so as to prevent oxidation from taking place in the glass batch. The oxides of the various metals may be added singly or in combination. It is preferred to use oxides of lead and copper simultaneously. If only copper oxide is employed, the glass, and bottles made therefrom, are brittle and will not withstand boiling water or pressure conditions. By substituting lead oxide for part of the copper, the resistance of the glass to shock, hot water and pressure is increased. By using lead oxide alone, however, glass is rendered too soft and the bottles made therefrom do not set quickly enough, tending to lose their shape while being transferred from the bottle making machine to the lehr.

It is to be understood that the proportions of metallic oxides added to the glass will vary with the character of the batch being treated and the characteristics of the glass tank employed. The availability of opacifiers or other metallic oxides influences the type of metallic oxide employed. For example, a plant near a copper-molybdenum mine may find it economical to use a sludge residual oxide from the mine operations, which would be perfectly satisfactory to produce the black opaque color.

In carrying out the invention, the sulphur, carbon and the metal or metallic oxide or oxides are intermixed in proper proportion and then added to the rest of the batch material such as sand, lime, alkali, cullet, etc., and then fed to the glass furnace at regular filling intervals. The sulphur, carbon and metallic oxide or oxides may be added singly to the regular batch mixture in the mixer, or preferably these opacifying agents are thoroughly mixed together and then added to the batch in the mixer. The latter method more thoroughly and intimately distributes the opacifying ingredients throughout the mass.

Reducing conditions are necessary in the glass furnace, as otherwise the carbon added to the mix would be expelled to a large extent in the form of carbon dioxide, and the sulphur in the form of sulphur dioxide. For this reason it is also desirable to employ the lower oxides of the metals. If oxidizing conditions exist in the glass furnace, the black metallic sulphide which it is desired to form would be formed only partially, with the possibility of its being oxidized to colorless or colored salts of no value as opacifying elements. The black metallic oxides which form the opacifying ingredient of the final glass are formed, therefore, by the reducing action of the carbon and sulphur upon the metal or metallic oxide, and in view of the fact that such metallic sulphide is formed in the glass itself during melting, their efficiency is greatly increased.

Although sulphur, carbon and metallic oxides have been individually employed in glass batches, there is no similarity whatsoever between the results obtained by such individual use of the ingredients and the results obtained when these materials are used in combination in accordance with this invention.

As an illustrative example of a glass mix capable of producing a dense, opaque, black, glossy glass adapted for use in the manufacture of durable, heat resisting bottles or containers, the following composition is given;

| | Per cent |
|---|---|
| 2100 lbs. sand | 50 |
| 1000 lbs. cullet | 23 |
| 800 lbs. soda ash | 18.3 |
| 360 lbs. limestone | 8.05 |
| 18 lbs. sea coal | 0.41 |
| 8 lbs. sulphur | 0.185 |
| 1.75 lbs. copper oxide | 0.035 |
| 1 lb. lead oxide | 0.02 |

It is to be understood that the above specific example is merely illustrative, and the invention is not limited to the specific proportions there defined. Preferably, the total quantity of carbon, sulphur and metal or metallic oxides added to a basic glass formula should not exceed 2% thereof. Normally, from about 0.6 to about 0.2% of these ingredients may be added to a basic glass formula of the character described hereinabove, and result in the production of a black, perfectly opaque glass of the desired physical durability for use in the manufacture of glass containers, either by the blow or blow and press machines or by means of other glass forming machines or methods.

In making up a composition such as is specifically defined hereinabove, the metallic oxides may be mixed with a little wet sand, sea coal and sulphur in a small container, such as a bucket, and then added to the weighted car of sand as it is dumped into the mixing hopper. Soda, lime and cullet are then dumped into the mixer in proper quantities, and the whole batch thoroughly mixed and then carried onto the automatic conveyors to the batch storage bins, from which the completed mixture is sent to the glass tanks.

I claim:

1. In a process of making black glass which will not transmit light into containers made therefrom, the step of adding an opacifier containing carbon, sulfur and copper and lead in a low state of oxidation to a glass mix or batch, said opacifier being added in quantity sufficient to produce an opaque black glass which will not transmit light.

2. A glass mix or batch containing carbon, a metallic oxide in a low state of oxidation capable of forming a black sulphide, and sulphur, the carbon, metallic oxide and sulphur being present in sufficient quantity to produce a black, opaque glass.

3. A glass mix or batch containing carbon, lead monoxide and sulphur in sufficient quantity to produce an opaqe, black glass.

4. A soda lime glass mix or batch containing a mixture of carbon, sulphur and a metallic oxide capable of forming a black suphide, in quantities sufficient to form an opaque glass suitable for use in containers.

5. A glass mix or batch containing lead monoxide, cuprous oxide, carbon and sulphur in quantity not exceeding about 2% of the glass mix, but sufficient to form an opaque glass suitable for use in containers.

6. A black, opaque glass which will not transmit light into containers made therefrom, said glass being obtained by adding a mixture of carbon, sulfur and cuprous and lead oxides to a soda lime glass batch, said carbon, sulfur and cuprous and lead oxides being capable of forming black sulfide during the melting operation.

7. A glass mix or batch containing an added opacifier comprising carbon, sulfur and two or more metals or oxides from the group including copper, mercury, nickel, iron, lead, silver and molybdenum, said added opacifier being present in quantity not exceeding about 2% of the glass mix but sufficient to product an opaque glass which will not transmit light into containers made therefrom.

8. A glass mix or batch containing an added opacifier comprising copper and lead oxides, carbon and sulfur, said opacifier being added in quantity not exceeding about 2% of the glass mix but sufficient to produce an opaque glass which will not transmit light into containers made therefrom.

9. A glass mix or batch containing a metallic oxide capable of forming a black sulfide, carbon and sulfur in quantity not exceeding about 2% of the glass mix but sufficient to produce an opaque glass which will not transmit light into containers made therefrom.

10. A glass mix or batch containing carbon, a metallic oxide capable of forming a black sulfide and sulfur in sufficient quantities to give an opaque glass which will not transmit light into containers made therefrom.

11. A glass mix or batch containing the following materials in approximately the proportions stated:

| Percent | |
|---|---|
| 74.5 | $SiO_2$ |
| 0.5 | $Al_2O_3$ |
| 17.5 | $NaO$ |
| 7.5 | $CaO$ | to which is added a mixture of carbon, sulfur and metallic oxides capable of forming a black sulfide in quantities sufficient to form an opaque glass suitable for use in containers which will not transmit light.

12. A glass mix or batch containing carbon, sulfur and a metallic oxide capable of forming a black sulfide during the melting operation, said metallic oxide, carbon and sulfur constituting between 1% and 2% of the glass mix and adapted to produce a glass which is opaque and which will not transmit light into containers formed thereof.

13. A glass mix or batch containing carbon, sulfur and a metallic oxide capable of forming a black sulfide during the melting operation, said metallic oxide, carbon and sulfur constituting between 1% and 2% of the total glass mix, carbon being present in greater quantity than sulfur and metallic oxide combined, the resulting glass mix being adapted to produce a glass which is black and opaque and which will not transmit light into containers formed thereof.

14. A glass opacifier capable of producing an opaque black glass which will not transmit light into containers made therefrom, said opacifier containing carbon, sulfur and metallic oxide capable of forming black sulfide, carbon being the main ingredient of said opacifier.

15. A glass opacifier capable of producing an opaque black glass which will not transmit light into containers made therefrom, said opacifier containing carbon, sulfur and copper and lead in a low state of oxidation.

Signed at Los Angeles, California, this 5th day of June, 1930.

CLARENCE W. CROWELL.